though specific quantities of the materials are given, variations may be made...

United States Patent Office 3,289,291
Patented Dec. 6, 1966

3,289,291
METHOD AND MATERIAL FOR METALLIZING CERAMICS
Leonard Reed, San Jose, Calif., assignor, by mesne assignments, to Varian Associates, a corporation of California
No Drawing. Filed May 17, 1963, Ser. No. 281,331
8 Claims. (Cl. 29—473.1)

This invention relates to an improved method and material for metallizing ceramics and more particularly to an improved method and material for applying a metallized vacuum tight surface which is inert to halogen gases on high alumina ceramics.

Metallized ceramics and ceramic-to-metal seals have found wide application in the electronics industry. New uses and applications of these materials sometimes requires that the metallized ceramic be vacuum tight and and inert to various gaseous atmospheres and yet be economical, reliable, relatively easy to fabricate and capable of being vacuum sealed to a metal body. Platinum is inert to halogen gases, however, heretofore in the prior art, platinum metallizing has been restricted to low temperature, mechanically weak surface layers painted onto various materials to obtain a conductive coating.

Accordingly, an object of this invention is to provide an improved method and material for providing a vacuum tight platinum metallizing layer on a ceramic body.

A further object of this invention is to provide a method and material for producing a metallized surface on a high alumina ceramic body which metallized surface is inert to halogen gases.

Still another object of this invention is to provide a method and material for producing a metallized surface on a ceramic body that may be used in high temperature oxidizing atmospheres.

A further object of this invention is to provide a method and material for producing a metallized surface on a ceramic body which can be vacuum bonded to a metallic body in an air atmosphere with a gold braze.

A still further object of this invention is to provide a method and material for metallizing a high alumina ceramic body in air.

These and other objects and advantages of this invention are attained by preparing a metallizing paint which includes a volatile solvent in which is suspended a powdered mixture comprising by weight 85 to 91% platinum and 15 to 9% by weight of a combination of powders including at least manganese oxide and silica. A high alumina ceramic body is coated with the metallizing paint and fired in air at a temperature between 1200° C. and 1300° C. to sinter the metallizing layer on the ceramic body. The resulting metallized surface is vacuum tight and inert to halogen gases. The metallized ceramic can be bonded to a metallic body by gold brazing in air to form a vacuum tight seal.

This invention, as well as other objects, features and advantages thereof will be readily apparent from consideration of the following detailed description.

In accordance with the principles of the present invention, a metallizing paint is prepared by suspending in a suitable volatile solvent a mixture of powders comprising by weight 85 to 91% platinum or platinum alloy powder with 15 to 9% by weight of a combination of powders including at least manganese oxide and silica. More specifically according to this invention, a metallizing paint is prepared which comprises by weight 10 parts of 1 to 5 micron platinum or precious metal platinum alloy powder and 1 part by weight of a combination of 1 to 5 micron oxide powders which includes 1.7 parts manganese oxide, 1.0 part silica and 0.6 part manganese stearate. 30.8 grams by weight of the platinum and oxide powders are combined with 20 milliliters of a suitable solvent, such as acetone or butyl acetate. To form a suitable nitrocellulose lacquer, 0.25 gram of nitrocellulose powder or solid is added to the solvent. Two milliliters of a suitable grinding resin, such as Beckersol 458A, may be added to the solvent. In order to control the consistency of the resulting paint, 5 cc. of another suitable lacquer, such as ethyl cellulose, can be added to the paint mix. The platinum, oxide powders and solvent are then ball milled for approximately 24 hours to obtain a metallizing paint having a uniform suspension of the platinum and oxide powders therein. In this regard, the manganese stearate is utilized to insure a substantially uniform suspension of the powders in the solvent.

Although specific quantities of the materials comprising a novel platinum metallizing paint are given hereinabove, it is to be understood that these quantities may be varied according to the paint characteristics desired without departing from the present invention. For example, more or less lacquer, such as ethyl cellulose, may be used in order to obtain the paint consistency desired. Also, manganese may be used in place of manganese oxide and the platinum may be replaced with a precious metal platinum alloy, such as platinum-palladium.

The metallizing paint is then applied to a high alumina ceramic body by any suitable means, such as by brushing, spraying or dipping. In accordance with this invention, a high alumina ceramic is defined as a ceramic containing 85% or more of alumina. A smooth coating 1 to 5 mils thick can be obtained by brushing the metallizing paint on the ceramic body.

The coated ceramic body is then fired in air (an oxidizing atmosphere, at a temperature between 1200° C. and 1300° C. for approximately ½ hour to sinter the platinum metallizing layer onto the ceramic body. In accordance with a preferred example of this invention, the firing took place at 1250° C. in air.

During the firing operation, the manganese oxide and silica react with the alumina in the ceramic to produce a viscous manganese-silica-alumina melt which occurs between 1100° C. and 1150° C. This melt partially surrounds the platinum grains and forms a bond between the platinum and the ceramic body. The firing operation produces a light silver-gray metallized layer on the platinum body which is vacuum tight and inert to halogen gases, such as fluorine and chlorine. The resulting metallized ceramic also has good tensile strength. For example, 2 bodies of high alumina ceramic metallized in accordance with the principles of this invention were brazed together with pure gold and pulled until they failed at 2,500 p.s.i.

The platinum metallized alumina ceramic may be bonded to a metallic body to provide a vacuum tight seal. This is accomplished by placing a gold brazing body, such as a gold strip or ring adjacent the metallized ceramic and the metal body which is to be bonded to the ceramic and heating the resulting assembly to the brazing temperature of gold which is approximately 1063° C. The resulting ceramic-to-metal seal is vacuum tight and the brazing operation may be performed in air, that is, in an oxidizing atmosphere. The resulting vacuum tight seal also has good tensile strength and can be utilized in a high temperature oxidizing atmosphere for a long period of time without affecting the seal.

What has been described is a method and material for applying a metallized vacuum tight surface which is inert to halogen gases on a high alumina ceramic body. The metallizing is performed in air and the resulting metallizing ceramic body may be vacuum tight bonded to a metallic body.

It is to be understood, of course, that the above detailed description relates to only preferred embodiments of this invention, and that it is intended to cover all changes and modifications of the examples of the invention herein chosen for the purpose of this disclosure which do not constitute departures from the spirit and scope of the invention as set forth in the appended claims.

What is claimed is:

1. The method of forming a vacuum tight metallizing surface on a high alumina ceramic body, said metallizing surface being inert to halogen gases, comprising the steps of: coating said ceramic body with a metallizing paint which includes a volatile solvent in which is suspended a powdered mixture comprising by weight a majority of platinum and a sufficient quantity of manganese and silica to form a viscous manganese-silica-alumina melt, and firing the coated ceramic body at a temperature between 1200° C. and 1300° C. in an oxidizing atmosphere.

2. The method according to claim 1, wherein the platinum to silica and manganese ratio is about 10 to 1.

3. The method according to claim, 1, wherein said platinum is a precious metal platinum alloy.

4. The method of forming a vacuum tight metallizing surface on a high alumina ceramic body, said metallizing surface being inert to halogen gases, comprising the steps of: coating at least a portion of said ceramic body with a metallizing paint which includes by weight 85 to 91% platinum powder and 15 to 9% of a combination of oxide powders including at least manganese oxide and silica in sufficient quantity to form a viscous manganese-silica-alumina melt, firing the coated ceramic body in air at a temperature between 1200° C. and 1300° C.

5. The method according to claim 4, wherein the combination of oxide powders includes 1.7 parts manganese oxide, 1.0 part silica and 0.6 part manganese sterate.

6. The method according to claim 4, wherein said platinum powder is replaced by platinum palladium powder.

7. The method according to claim 4, wherein said manganese oxide is replaced by manganese.

8. The method of bonding a body of high alumina ceramic to a metallic body comprising the steps of: coating the ceramic body with a vacuum tight metallizing layer which is inert to halogen gases by firing the ceramic in air at a temperature between 1200° C. and 1300° C. after the ceramic body has been coated with a metallizing paint which includes a volatile solvent in which is suspended a powder mixture comprising by weight a majority of platinum powder and a sufficient quantity of manganese oxide and silica powder to form a viscous manganese-silica-alumina melt, placing a gold brazing body adjacent said metallized ceramic body and said metallic body which is to be bonded to said metallized ceramic, and heating said bodies to the brazing temperature of gold.

References Cited by the Examiner
UNITED STATES PATENTS

| | | | |
|---|---|---|---|
| 2,351,974 | 6/1944 | Kollmar | 106—1 |
| 2,411,867 | 12/1946 | Brenner | 106—1 X |
| 2,418,460 | 4/1947 | Buehler | 29—473.1 X |
| 2,650,683 | 9/1953 | McPhee et al. | 189—36.5 |
| 2,728,425 | 12/1955 | Day | 189—36.5 |
| 2,776,472 | 1/1957 | Mesick | 29—473.1 |
| 2,822,279 | 2/1958 | Larsen et al. | 106—1 |
| 3,214,833 | 11/1965 | Erickson | 29—473.1 |

JOHN F. CAMPBELL, *Primary Examiner.*